United States Patent [19]

Birzele et al.

[11] 4,271,518

[45] Jun. 2, 1981

[54] DATA TRANSMISSION/RECEPTION INSTALLATION WITH PARALLEL/SERIAL AND SERIAL/PARALLEL CHARACTER CONVERSION FOR DATA EXCHANGE BETWEEN COMMUNICATING DATA PROCESSING SYSTEMS

[75] Inventors: Paul Birzele; Gerhard Geitz, both of Munich, Fed. Rep. of Germany

[73] Assignee: Siemens Aktiengesellschaft, Berlin & Munich, Fed. Rep. of Germany

[21] Appl. No.: 23,306

[22] Filed: Mar. 23, 1979

[30] Foreign Application Priority Data

Mar. 28, 1978 [DE] Fed. Rep. of Germany ....... 2813383

[51] Int. Cl.³ .................................... G06F 11/10
[52] U.S. Cl. ...................... 371/37; 364/200
[58] Field of Search ............... 364/200, 900; 340/146.1 AL; 371/38, 39, 40, 37

[56] References Cited

U.S. PATENT DOCUMENTS

| | | | |
|---|---|---|---|
| 3,825,905 | 7/1974 | Allen, Jr. ................ | 364/200 |
| 3,842,405 | 10/1974 | Key et al. ............... | 364/200 |
| 4,100,601 | 7/1978 | Kaufman et al. ........ | 364/200 |
| 4,103,328 | 7/1978 | Dalmasso ................ | 364/200 |
| 4,106,092 | 8/1978 | Millers ................... | 364/200 |

OTHER PUBLICATIONS

Microprocessor Modules Data Book, System SAB 8080, Published by Siemens AG, 1976/77, pp. 63-79.

Primary Examiner—Charles E. Atkinson
Attorney, Agent, or Firm—Hill, Van Santen, Steadman, Chiara & Simpson

[57] ABSTRACT

A data transmission/reception installation with parallel/serial and serial/parallel character conversion is disclosed which relieves the respective local data processing installation of all tasks connected with data transmission procedures. Both a temporal vitiation of the data processing operations as well as a reduction of the memory capacity available for the data processing operations are avoided. The data transmission/reception installation disclosed has a data transmission processor arranged within the respective data processing system between the local data processing installation and a data modem terminating a data line for controlling data transmission and reception procedures. The data transmission processor contains at least one microprocessor and a transcribable program memory. A cyclic redundancy check generator is provided by means of which a data transmission and reception monitoring corresponding to a stored test program can be carried out.

6 Claims, 2 Drawing Figures

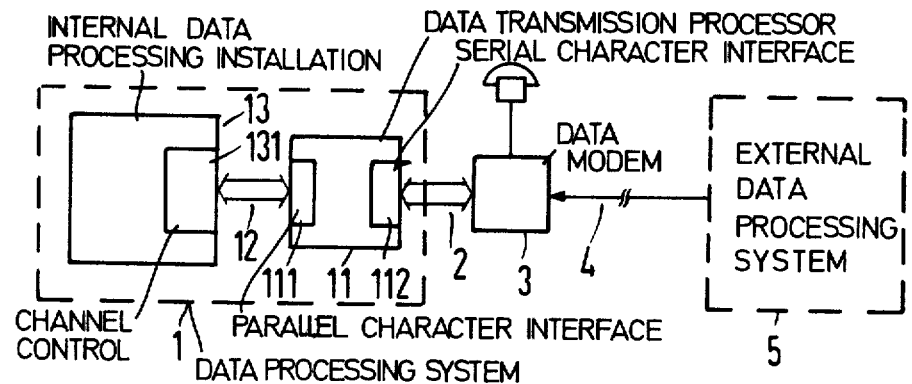
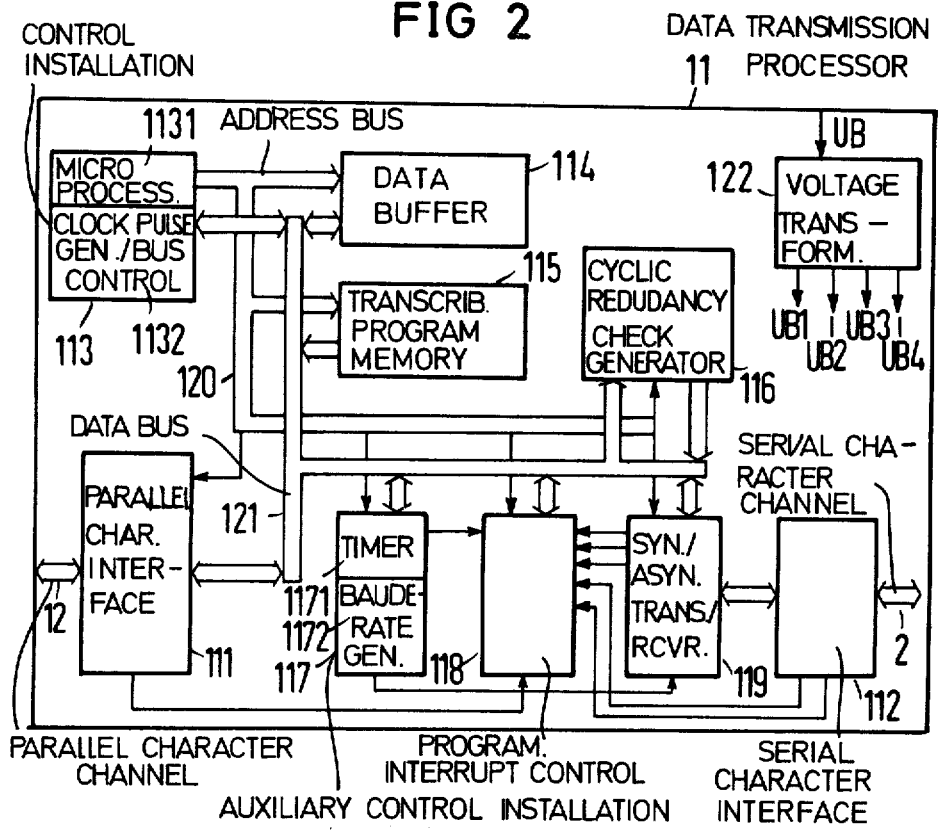

DATA TRANSMISSION/RECEPTION INSTALLATION WITH PARALLEL/SERIAL AND SERIAL/PARALLEL CHARACTER CONVERSION FOR DATA EXCHANGE BETWEEN COMMUNICATING DATA PROCESSING SYSTEMS

BACKGROUND OF THE INVENTION

The invention relates to a data transmission/reception installation with parallel/serial and serial/parallel character conversion for data exchange between communicating data processing systems.

Known data communication systems are regularly provided by means of complex and space-wasting hardware. Thereby, the procedure steps are program controlled, whereby the respective data processing installation which communicates with an external data processing system is also employed. Disadvantageous in such an arrangement is that the data processing installation is burdened with required procedure control tasks beyond its actual task, namely, to process data. Because of that, its working speed can be prejudiced on the one hand and, on the other hand, a disadvantageous reduction of the storage capacity available for its actual task can be produced. A reduced working speed is particularly disadvantageous in data processing systems which must work in real-time operation.

SUMMARY OF THE INVENTION

An object of the present invention is to create a data transmission/reception installation, particularly for data exchange between communicating data processing systems, in which the said disadvantages do not occur.

The object is based on the idea of unburdening the data processing installation of all tasks connected with data transmission procedures. Therefore, both a vitiation of the data processing processes as well as a reduction of the memory capacity available for data processing processes is avoided.

The object is achieved by means of a data transmission/reception installation with parallel/serial and serial/parallel character conversion as noted above which has a data transmission processor arranged within a data processing system between an internal data processing installation of the data processing system and a data modem terminating a data line for controlling data transmission and/or reception procedure. The data transmission processor contains at least one microprocessor and a transcribable program memory. A cyclic redundancy check generator monitors a data transmission and/or reception according to a stored test program.

The invention offers the advantage that the hardware expense is significantly reduced by means of the employment of a microcomputer formed of a microprocessor and a transcribable program memory and that the entire data transmission procedure can be independently managed with the data transmission processor so that the data processing installation is unburdened. It is further advantageous that the data transmission processor which is inventively arranged between the internal data processing installation and a data modem terminating a data line is modularly constructed of standard modules, so that no expensive developmental work is required for customer-specific circuits.

BRIEF DESCRIPTION OF THE DRAWINGS

FIG. 1 shows a block diagram of a data processing system 1 in which a data transmission processor 11 is inventively arranged between a data processing installation 13 and a data modem 3 terminating a data line 4;

FIG. 2, in the form of a block diagram, shows details of a sample embodiment for the inventive data transmission processor 11 which can be connected via a parallel character channel 12 with the data processing installation 13 and via a series character channel 2 with the data modem 3.

As already explained, FIG. 1 shows the block diagram of a data processing system 1 with the inventive arrangement of a data transmission processor 11. The data transmission processor 11 exhibits a respective parallel character interface 111 and a serial character interface 112. The transmission of data to or from an external data processing system 5 is carried out in a manner known per se by means of a parallel/serial and serial/parallel character conversion via the data line 4 provided as a dedicated line or as a selection line. The data transmission processor 11 accepts data from the internal data processing installation 13 or delivers such data to the data processing installation 13 via the parallel character channel 12 and the parallel character interface 111 and delivers serial characters to the external data processing system 5 via the serial character interface 112, the serial character channel 2, the data modem 3 (modulator-demodulator) and the data line 4, or receives serial characters from the external data processing system 5 via the above described path. The internal data processing installation 13 exhibits a channel control 131 only for the delivery or acceptance of characters via the parallel character channel 12.

As already explained, FIG. 2 illustrates the block diagram of a sample embodiment for the inventive data transmission processor 11 in detail. The core piece of the data transmission processor 11 is an inventively arranged microprocessor 1131. Together with a transcribable program memory 115 preferably executed as an EPROM and a combined auxiliary installation functioning as a clock pulse generator/bus control 1132, this microprocessor forms a microcomputer designated as control installation 113. The program memory 115, the parallel character interface 111, an auxiliary control installation 117 which contains a timer 1171 and a baud-rate generator 1172, a programmable interrupt control 118, a cyclic redundancy check generator 116, a universal synchronous/asynchronous transmitter/receiver 119 and a memory with random access serving as a data buffer which is preferably executed as a RAM are controllable via an address bus 120 in a manner known per se. For the above well known components see the Microprocessor Modules Data Book, 1976/77 System SAB 8080 incorporated herein by reference, published by Siemens AG, and particularly Area of Component Parts, pp.63–79: "Interconnection of the SAB 8080 with other Microcomputer Modules". The control installation 113, in turn, is connected via a data bus 121 with the data buffer 114, the program memory 115, the parallel character interface 111, the auxiliary control installation 117, the programmable interrupt control 118, the cyclic redundancy check generator 116 and the universal synchronous/asyncronous transmitter/receiver 119. The data buffer 114 serves to intercept data back-ups occurring during data transmission and/or reception processes. With the help of the programmable interrupt control 118, processing operations running in the microprocessor 1131 are interrupted by characters having a higher processing priority than the data being processed at the moment, which characters are accepted via the parallel character interface 111 from the internal data processing installation 113 or via the serial character interface 112 from the external data processing system 5. The timer 1171 serves for the generation of procedure supervision times. The baud-rate generator 1172 offers the possibility of adjusting the respectively optimum transmission speed with the help of the timer 1171.

In the sample embodiment for the inventive data transmission/reception installation illustrated in FIG. 2, the parallel character interface 111, via which the characters are trasmitted in the direction to the internal data processing installation 13 or are transmitted from this via the parallel character channel 12 in the direction of the external data processing system 5, is organized in an interface specific manner. Its mechanical construction is selected in such manner that a simple, time-saving interchangeability is produced for that case when a use-conditioned adaption to the parallel character channel 12 is required. In a further development of the invention, it is provided that the parallel character interface 111 is provided as programmable, so that an adaptation to a parallel character channel 12 laid out as desired to be undertaken without mechanical work is rendered possible.

Characters accepted from the outside via the serial character channel 2 and the serial character interface 112 are supplied to the universal synchronous/asynchronous transmitter receiver 119. This synchronous/asynchronous transmitter/receiver 119, as already mentioned, is connected to the data bus 121, so that both a data transmission monitoring to be undertaken in the cyclic redundancy check generator 116 can be carried out as well as the relaying to the parallel character interface 111 or, if necessary, to the data buffer 114.

The combined installation clock pulse generator/bus control 1132 which, together with the microprocessor 1131, forms the control installation 113 of the data transmission processor 11, assumes, with the help of the address bus 120, the control of and the data distribution to all of the individual installations connected to the data bus 121.

By means of the inventive arrangement of the data transmission processor 11, which is programmable per se, an adaptation of the various data transmission conditions to the respectively present internal data processing installations 13 or, respectively, external data processing systems 5, is advantageously produced in a simple manner. Data transmission speeds as well as data blocks, test cycles, data protection measures—such as redundancy checks—character level adaptations, etc., can be varied in any manner desired. Thus, the inventive data transmission-reception installation can be universally employed for purposes of data exchange between communicating data processing systems.

Beyond that, the conceptualization of the data transmission processor 11 makes it possible to connect a plurality of data transmission processors 11 to the parallel character channel 12 in complex data processing systems. Likewise, a plurality of internal data processing installations 13 can be connected to the parallel character channel 12, so that any desired mixed data traffic between a plurality of internal data processing installations 13 on the one hand and a plurality of external data processing systems 5 on the other hand is rendered possible.

The various modules within the data transmission processor 11 are supplied with the required operating voltages UB1, UB2, UB3, UB4 from a voltage transformer 122. These various operating voltages are generated in the voltage transformer 122 from a single supply voltage UB. The advantageous arrangement of the voltage transformer 122 within the data transmission processor 11 and the employment of standardized integrated circuit modules allows a compact construction of the data transmission processor 11 in a single plug-in component group which exhibits only two posts for the supply voltage UB to be supplied and the required posts for the parallel character channel 12 and the serial character channel 2.

The unburdening of the internal data processing installation 13 achievable by means of the invention allows the advantageous employment of the inventive arrangement particularly in data processing systems which work in real-time operation. Included, here, among others, are process control systems and program-controlled telephone or data switching systems.

Although various minor modifications may be suggested by those versed in the art, it should be understood that we wish to embody within the scope of the patent warranted hereon, all such embodiments as reasonably and properly come within the scope of our contribution to the art.

| "Description of Circuit Elements" | | |
|---|---|---|
| Circuit block in FIG. 2 | Page reference in INTEL MCS-80 User's Manual (with introduction to MCS-85) October 1977 and | (circuit type number) |
| microprocessor 1131 | 6-1 | (8080 A) |
| clock pulse generator and bus control 1132 | 6-20 and 6-32 | (8224) (8238) |
| data buffer 114 | 6-112 | (2114) |
| transcribable program memory 115 | 6-60 | (2716) |
| timer and Baud-rate-generator 117 | 6-212 | (8253) |
| programmable interrupt control 118 | 6-265 | (8259) |
| synchronous/asynchronous transmitter/receiver 119 | 6-194 | (8251) |
| parallel character interface 111 | 6-223 | (8255) |
| perial character interface 112 | standard V-24 interface | |
| cyclic redundancy check generator 116 | universal polynomial generator Motorola MC 8503 | |
| voltage transformer 122 | standard DC-DC converter | |
| data-modem 3 | standard post modulator/demodulator unit for synchronous transmission | |

We claim as our invention:

1. A data transmission/reception installation with parallel/serial and serial/parallel character conversion for data exchange with an external data processing system comprising: a data transmission processor means for parallel/serial and serial/parallel character conversion arranged with an internal data processing installation within a data processing system, said data transmission processor means being connected between said internal data processing installation and a data modem means terminating a data line for controlling data transmission and/or reception procedure; said data transmission processor means having at least one microprocessor connecting by an address bus to a transcribable program memory, and a cyclic redundancy check generator means connected by a data bus to the transcribable program memory for monitoring a data transmission and/or reception according to a stored test program; a data buffer means having a memory with random access connected by the address bus to the microprocessor for intercepting data back-ups occurring upon data transmission and/or reception; and a timer means connected to the data bus and program interrupt control for generation of procedure supervision times, and a baud-rate generator means connected to the timer means for adjustment of a respectively optimum transmission speed by means of said timer means.

2. A data transmission/reception installation with parallel/serial and serial/parallel character conversion for data exchange with an external data processing system comprising: a data transmission processor means for parallel/serial and serial/parallel character conversion arranged with an internal data processing installation within a data processing system, said data transmission processor means being connected between said internal data processing installation and a data modem means terminating a data line for controlling data transmission and/or reception procedure; said data transmission processor means having at least one microprocessor connecting by an address bus to a transcribable program memory, and a cyclic redundancy check generator means connected by a data bus to the transcribable program memory for monitoring a data transmission and/or reception according to a stored test program, a programmable interrupt control means connected to the data bus for interrupting processing operations occurring in the microprocessor when characters of a higher processing priority than data being processed at the moment are accepted via a parallel character interface means connecting to said internal data processing installation or via a serial character interface means connected to the external data processing system; the parallel and serial character interfaces connecting to the interrupt control means; and the parallel character interface means being programmable for adaptation to a parallel character channel of desired design.

3. A data transmission/reception installation according to claim 2 wherein the parallel character interface means is adaptable and is mechanically constructed for use with a desired interface interchangeability.

4. A data transmission/reception installation according to claim 2 wherein a plurality of said data transmission processor means are connected to the parallel character channel.

5. A data transmission/reception installation according to claim 2 wherein a plurality of internal data processing installations are connected to the parallel character channel.

6. A data transmission/reception installation according to claim 2 wherein a plurality of data transmission processor means and a plurality of internal data processing installations are connected to the parallel character channel.

* * * * *